United States Patent [19]
Hwang

[11] Patent Number: 5,271,446
[45] Date of Patent: Dec. 21, 1993

[54] MULTI-PURPOSE AUTOMATICALLY REWINDABLE SUN-SHADE

[76] Inventor: Chyi-Ming Hwang, No. 15, Alley 44, Lane 46, Cherng-Gong Road, Yung-Kang Shiang, Tainan Hsien, Taiwan

[21] Appl. No.: 925,455

[22] Filed: Aug. 11, 1992

[51] Int. Cl.[5] .............................................. E06B 9/08
[52] U.S. Cl. ................................... 160/23.1; 160/120; 160/317
[58] Field of Search ................ 160/23.1, 24, 32, 239, 160/370.2, 317, 323.1, 903, 120, 241

[56] References Cited

U.S. PATENT DOCUMENTS

| | | | |
|---|---|---|---|
| 1,544,702 | 7/1925 | Trifari | 160/317 X |
| 2,696,250 | 12/1954 | Michelman | 160/317 X |
| 2,886,047 | 5/1959 | Healy | 160/24 |
| 3,581,436 | 6/1971 | Basiger | 160/24 X |
| 4,335,773 | 6/1982 | Masi | 160/23.1 |
| 5,036,898 | 8/1991 | Chen | 160/23.1 |
| 5,054,533 | 10/1991 | Lii | 160/23.1 X |
| 5,172,745 | 12/1992 | Wang | 160/23.1 X |

*Primary Examiner*—David M. Purol
*Attorney, Agent, or Firm*—Pro-Techtor International

[57] ABSTRACT

A multi-purpose automatically rewindable sun-shade devised to have a quite long resilient curtain which is wound around a winding tubular shaft when it is not in use. The curtain may be pulled out to a needed length for use and rewound automatically on the winding shaft by twisted coil springs. The sun-shade comprises an elongated winding tubular shaft for winding a long curtain thereon, two immovable rods adapted to extend in the interior of the winding shaft, two coil springs fitting around the immovable rods in the winding shaft to generate tension when twisted. The tension force rotates the winding shaft to rewind the curtain after use. The shade has two sleeves assembled around the winding shaft and forming a central through hole for a square end of each of the immovable rods to pass through to engage a central square hole in each of two shaft caps assembled with the two sleeves so that the sleeves and the winding shaft can rotate together between the two shaft caps. An elongated semi-circular plate is assembled with the two shaft caps to cover and protect the winding shaft and the curtain wound thereon.

1 Claim, 5 Drawing Sheets

MULTI-PURPOSE AUTOMATICALLY REWINDABLE SUN-SHADE

BACKGROUND OF THE INVENTION

A sun-shade commonly used is a large sheet of canvas stretched and pulled by ropes to shield a frame or a roof of a truck or trailer. In order to use this type of sun-shade, the sheet of canvas must be stretched out to utilize and must be folded repeatedly to store, an is not convenient to use.

SUMMARY OF THE INVENTION

This multi-purpose automatically rewindable sun-shade has been devised to have a quite long resilient curtain which is wound around a winding tubular shaft when it is not in use. The curtain may be pulled out to a needed length for use and rewound automatically on the winding shaft by twisted coil springs.

The multi-purpose automatically rewindable sun-shade in the present invention has been designed to have the following advantages.

1. It has a grip including a round rod on which an outer end of a long curtain is bound. A rope can be bound on the grip to pull out the curtain to whatever length is needed.

2. It can be easily and quickly deployed, and can be automatically rewound for retraction.

The sun-shade in the present invention comprises an elongated winding tubular shaft for winding a long curtain thereon, two immovable rods adapted to extend in the interior of the winding shaft, and two coil springs fitting around the immovable rods in the winding shaft to generate tension when twisted. The tension force rotates the winding shaft to rewind the curtain after use. The shade has two sleeves assembled around the winding shaft and forming a central through hole for a square end of each of the immovable rods to pass through to engage a central square hole in each of two shaft caps assembled with the two sleeves so that the sleeves and the winding shaft can rotate together between the two shaft caps. An elongated semi-circular plate is assembled with the two shaft caps to cover and protect the winding shaft and the curtain wound thereon.

DETAILED DESCRIPTION OF THE INVENTION

Figure 1:
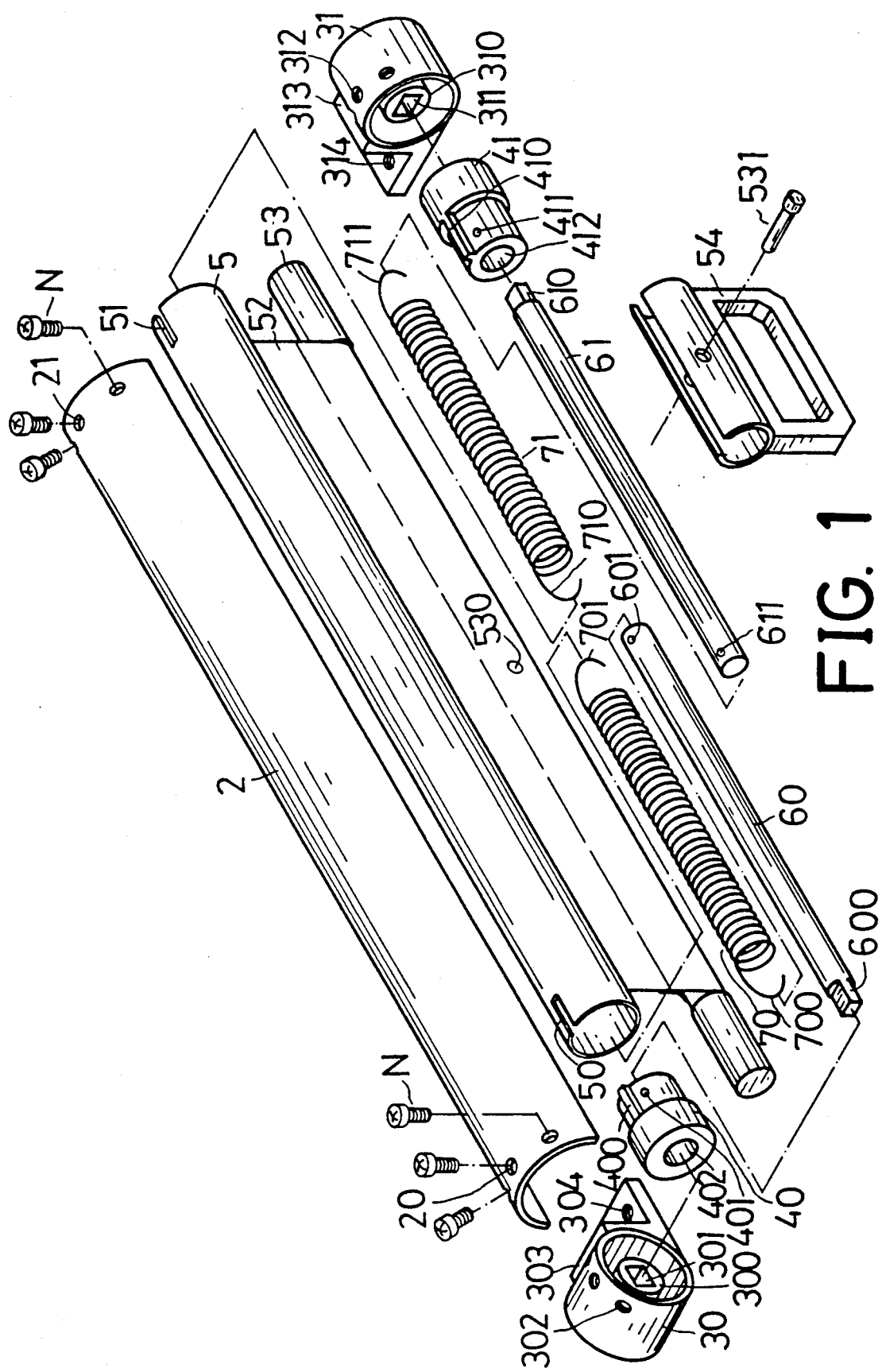
FIG. 1 is an exploded perspective view of a multi-purpose automatically rewindable sun-shade in the present invention.

A multi-purpose automatically rewindable sun-shade in the present invention, as shown in FIG. 1, comprises an elongated semi-circular cover plate 2, two shaft caps 30, 31, two sleeves 40, 41, a winding tubular shaft 5, a curtain 52, a round rod 53, two immovable rods 60, 61 and two coil springs 70, 71 as its main components.

The elongated semi-circular cover plate 2 has screw holes 20, 21 in both ends for screws N to fix the plate 2 on the two shaft caps 30, 31 having threaded holes 302, 312.

The two shaft caps 30, 31 are combined with both ends of the elongated semi-circular cover plate 2. The shaft caps 30, 31 respectively having round posts 300, 310 in their interior; central square holes 302, 312 in an outer spherical surface for the screws N to engage; L-shaped blocks 303, 313 formed to extend sideways for anchoring purposes; and multiple bolt holes 304, 314 in the L-shaped blocks 303, 313.

The two sleeves 40, 41 are assembled with the shaft caps 30, 31 each having two different sized portions, a large portion and a small portion, and central through holes 402, 412. The small portions of the sleeves have fitting ridges 400, 410 to fit in slots 50, 51 in the winding tubular shaft 5, and also include holes 401, 411.

The winding tubular shaft 5 has two lengthwise slots 50, 51 respectively in each end to receive the fitting ridges 400, 410 in the two sleeves 40, 41 so that the winding tubular shaft 5 and the two sleeves 40, 41 can rotate together.

the curtain 52 is wound on the winding tubular shaft 5, having its outer end bound on a round rod 53 and its inner end bound on the winding tubular shaft 5.

The round rod 53 is slightly longer that the width of the curtain 52 so that it contacts the two shaft caps 30, 31. The round rod 53 has a through hole 530 in the intermediate portion for a rivet 531 to pass through to fix a grip 54 on the round rod 53 so as to enable a user to pull out curtain 52.

The two immovable rods 60, 61 are interposed lengthwise in the interior of the winding tubular shaft 5, respectively having square ends 600, 610 to engage square holes 301, 311 in the shaft caps 30, 31 so as to be kept immovable by the shaft caps 30, 31. The rods 60, 61 also include hook holes 601, 611 on round ends for end hooks of two coil springs 70, 71 to hook therein.

The two coils springs 70, 71 are respectively fixed around the immovable rods 60, 61 in the winding tubular shaft 5, each having two end hooks 700, 701, 710, 711 to respectively hook in the hook holes 401, 411 in the sleeves 40, 41 and the hook holes 601, 611 in the immovable rods 60, 61. This causes the coil springs to twist and to generate a rewinding tension force when the shaft 5 is rotated to let out the curtain 52.

Figure 2:
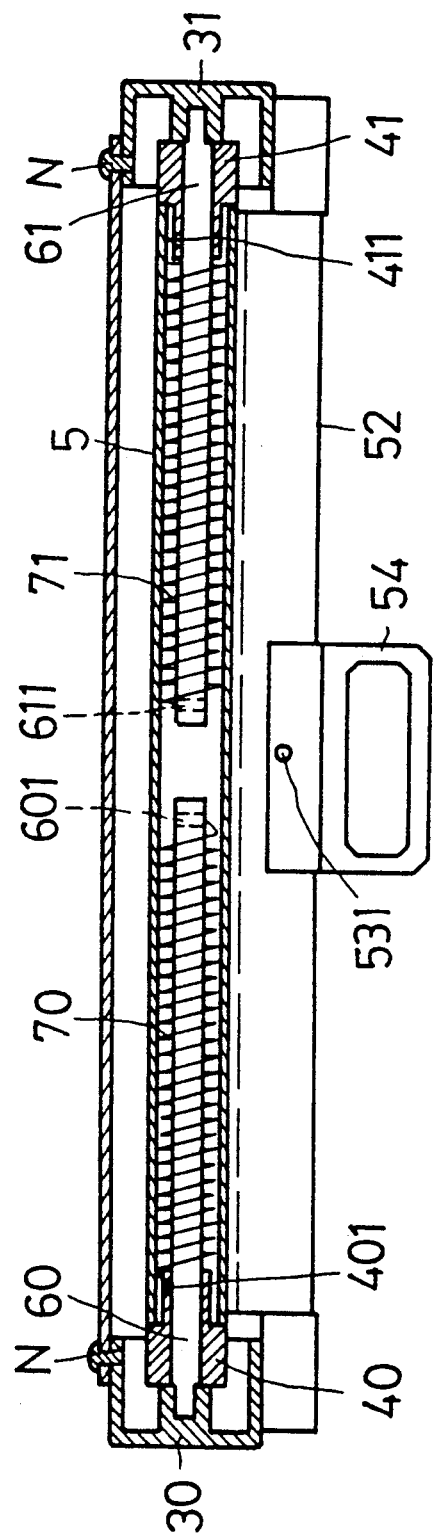
FIG. 2 is a cross-sectional view of the multi-purpose automatically rewindable sun-shade in the present invention.

In assembling this sun-shade, as shown in FIGS. 1, 2, first the shaft caps 40, 41 and the coil springs 70, 71 are respectively inserted around the immovable rods 60, 61 and two pairs of end hooks 700, 711 and 701, 710 are respectively hooked in the hook holes 401, 411 in the sleeves 40, 41 and the hook holes 601, 611 in the immovable rods 60, 61. Then the square ends 600, 610 are respectively inserted in the square holes 301, 311 in the shaft caps 30, 31. Then the immovable rods 60, 61, the coil springs 70, 71 and the sleeves 40, 41 combined together are respectively inserted through both ends of the winding tubular shaft 5 to extend into the interior of the shaft 5. The fitting ridges 400, 410 respectively engage the slots 50, 51 in the shaft 5 to secure the sleeves 40, 41 on the shaft 5. Lastly, the screws N are used to fix the elongated semi-circular cover plate 2 to the shaft caps 30, 31, engaging the screw holes 302, 312.

Figure 3:
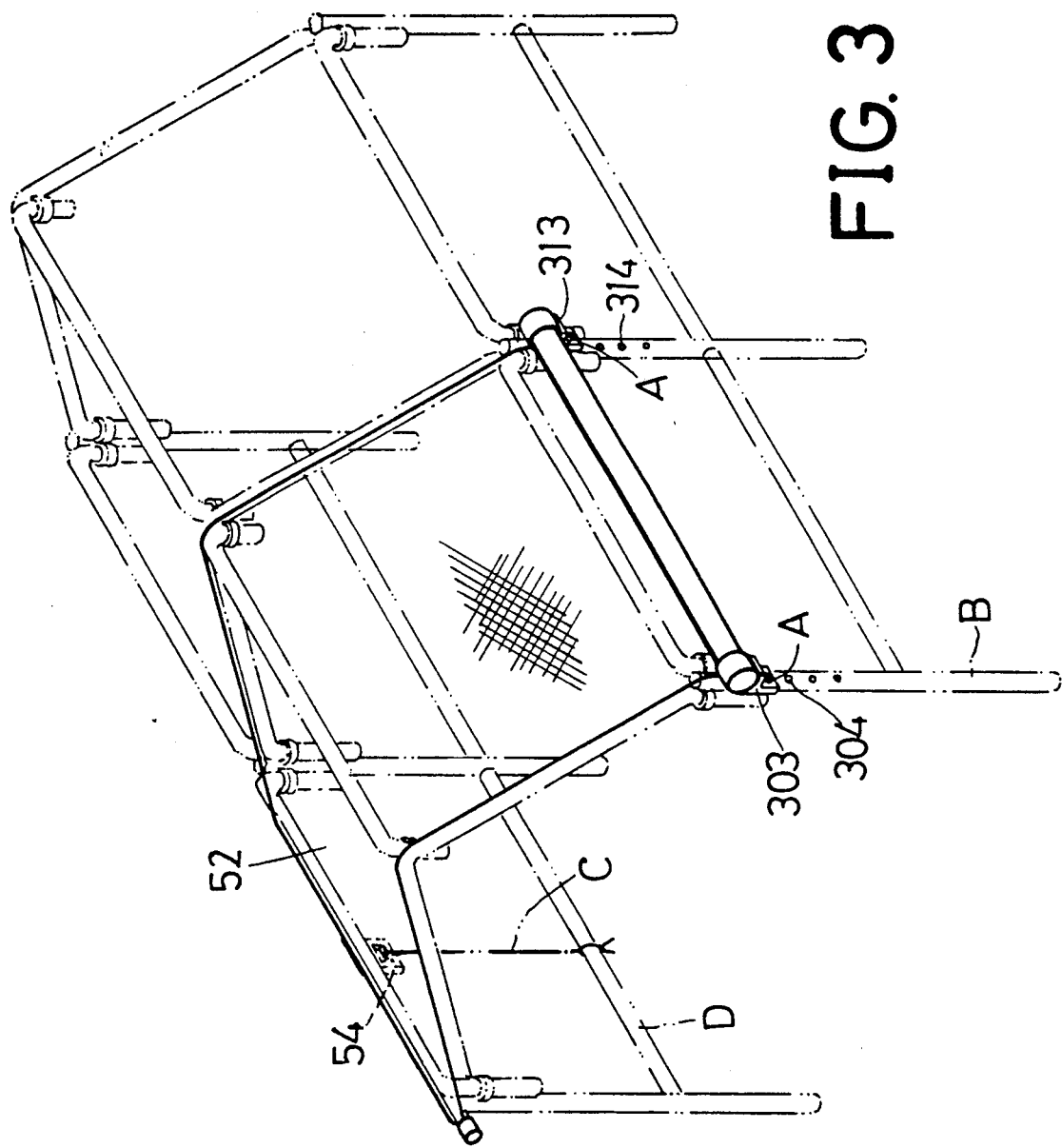
FIG. 3 is a perspective view of the multi-purpose automatically rewindable sun-shade applied to a collapsible frame standing on the ground.

In using this sun-shade, if it is applied to a collapsible frame for banquets or rituals or ceremonies as shown in FIG. 3, this sun-shade can be fixed securely on two upright posts B, B by bolting fixing blocks 303, 313 to the posts B, B. Then a long rope C is bound o the grip 54 and tossed over a roof of the frame to the other side of the frame. Next, the rope C is pulled to draw the curtain 52 out of the winding shaft 5 to lay it on the roof of the frame. when the curtain 52 is drawn out to a length enough to cover the roof, then the rope C is bound tightly on a horizontal rod D to secure the curtain 52. The coil springs 70, 71 are then in a twisted condition, ready to pull and rewind the curtain 52 back on the winding shaft 5 if the rope C is released.

When the curtain 52 is to be rewound after it has been pulled out, the rope C is released from the horizontal rod D. Then the coil springs 70, 71 rotate the winding shaft 5 to roll back the curtain 52 thereon. To prevent the curtain from being rolled back too fast, a user can hold the rope C to let the curtain slowly rewind.

Figure 4:
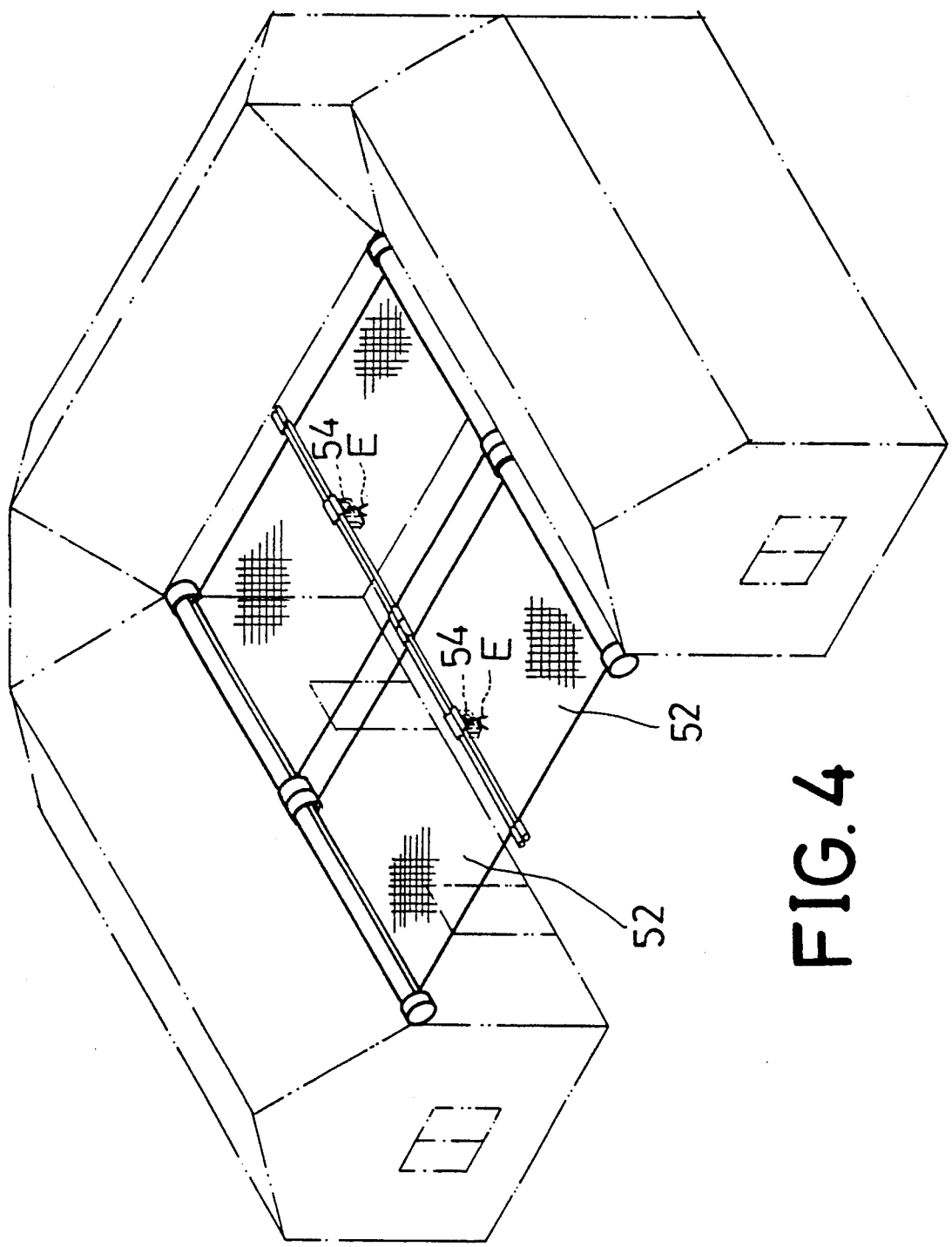
FIG. 4 is a perspective view of the sun-shade applied to shield a yard between two houses.

If this sun-shade is to be applied to a balcony or a yard, it can be bolted securely on a proper point of an eave or a cornice of a house as shown in FIG. 4. Then a rope E is bound on the grip 54 and the curtain 52 can be pulled out by the rope E to a length required. If the dimensions to be shielded are too large, a plurality of the sun-shades can be used at the same time according to necessity.

Figure 5:
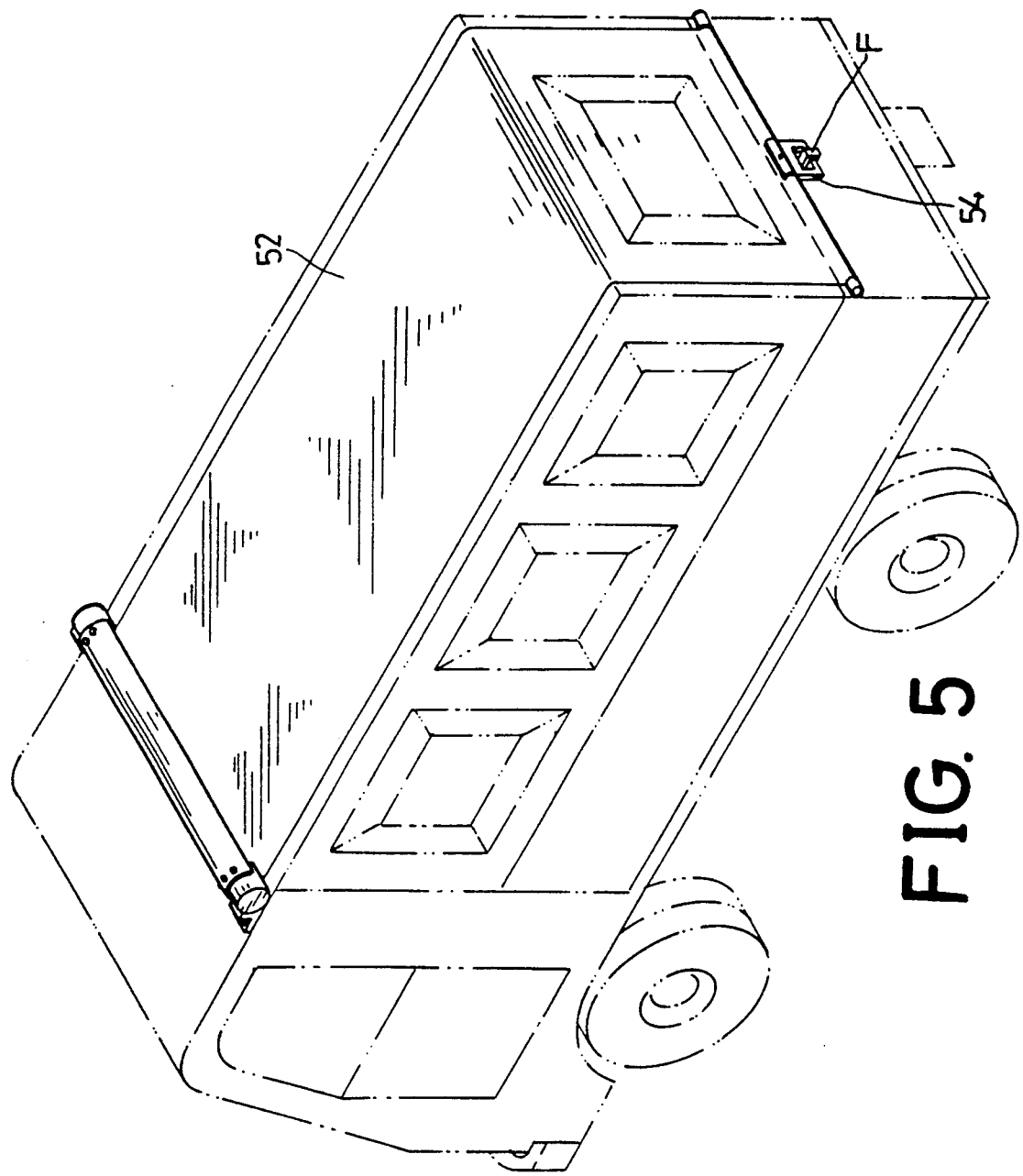
FIG. 5 is a perspective view of the sun-shade applied to a roof of a truck or trailer.

This sun-shade can also be applied to shield a roof of a truck or trailer as shown in FIG. 5. The sun-shade is bolted securely on a proper point of the truck. The curtain 52 is pulled over packaged merchandise piled on the roof of the truck or trailer, and the grip is secured on a hook F of the truck.

I claim:

1. A multi-purpose automatically rewindable sun-shade comprising:
   an elongated tubular winding shaft including a slot in each end thereof;
   a long curtain wound around the winding shaft having an outer end bound on a round rod which is longer than the width of the curtain, said round rod including a grip at its intermediate portion;
   two immovable rods extending lengthwise in the interior of the winding shaft, each immovable rod having a square end to engage in a central square hole in two shaft caps, and a second end including a hook hole to receive an end hook of two coil springs;
   two coil springs fitting around the immovable rods and extending lengthwise in the interior of the winding shaft, each spring having two end hooks to hook in the hook holes in the end of the immovable rods and in hook holes in small diameter portions of two sleeves which fit into each end of the winding shaft;
   the two sleeves including a large diameter portion as well as the small diameter portion, a central through hole for the square ends of the immovable rods to pass through to engage in the central square holes in the two shaft caps, the small diameter portion including a lengthwise projecting ridge to engage the slot in each end of the winding shaft so that the winding shaft rotates with the sleeves within the shaft caps;
   the two shaft caps supporting the two immovable rods and enclosing the large diameter portions of the sleeves, each cap having a central square hole in its interior for the square end of the immovable rods to engage, and an L-shaped fixing block extending therefrom so that the shaft caps and hence the sun-shade may be fixed in position while allowing the winding shaft to rotate; and
   an elongates semi-circular cover plate affixed to the shaft caps to cover and protect the winding shaft and the curtain wound thereon;
   such that when an extending force is applied by a user to the curtain, the curtain unrolls from the winding rod and extends to protect a subject area;
   and as the curtain is unrolled, the coil springs are twisted by the rotation of the winding shaft to generate a tension force which tends to rewind the curtain around the winding shaft;
   so that when the extending force is released, the curtain automatically rewinds around the winding shaft, the round rod contacting the shaft caps to prohibit the winding shaft from further rotation once the curtain is fully retracted.

* * * * *